US009471942B2

(12) United States Patent
Song et al.

(10) Patent No.: US 9,471,942 B2
(45) Date of Patent: Oct. 18, 2016

(54) APPARATUS AND METHOD FOR PROCESSING QUERY IN PORTABLE TERMINAL FOR SOCIAL NETWORK

(75) Inventors: Hee-Jun Song, Yongin-si (KR); Seung-Yeol Yoo, Suwon-si (KR); Nam-Hoon Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 826 days.

(21) Appl. No.: 13/327,606

(22) Filed: Dec. 15, 2011

(65) Prior Publication Data

US 2012/0166536 A1  Jun. 28, 2012

(30) Foreign Application Priority Data

Dec. 24, 2010  (KR) .................. 10-2010-0134465

(51) Int. Cl.
*G06F 15/173* (2006.01)
*G06Q 50/00* (2012.01)
*H04L 12/58* (2006.01)

(52) U.S. Cl.
CPC ............. *G06Q 50/01* (2013.01); *H04L 51/046* (2013.01); *H04L 51/32* (2013.01)

(58) Field of Classification Search
None
See application file for complete search history.

(56) References Cited

U.S. PATENT DOCUMENTS

| 6,233,623 | B1 | 5/2001 | Jeffords et al. |
| 7,603,464 | B2 | 10/2009 | White |
| 2002/0019864 | A1 | 2/2002 | Mayer |
| 2008/0316925 | A1 | 12/2008 | Dolin et al. |
| 2011/0256889 | A1* | 10/2011 | Polis et al. ................. 455/456.3 |

FOREIGN PATENT DOCUMENTS

| JP | 2008146355 | 6/2008 |
| JP | 2009199368 | 9/2009 |
| KR | 2002-0016198 | 3/2002 |
| KR | 20090066066 | 6/2009 |

OTHER PUBLICATIONS

International Search Report dated May 30, 2012 in connection with International Patent Application No. PCT/KR2011/009739.
Written Opinion of International Searching Authority dated May 30, 2012 in connection with International Patent Application No. PCT/KR2011/009739.

* cited by examiner

*Primary Examiner* — Scott B Christensen

(57) ABSTRACT

A portable terminal which supports a social network, more particularly, an apparatus and a method for generating a community with agents of the same character in a social network and processing an answer to a query by sharing information between the generated communities. The apparatus includes an agent determiner configured to set an agent for a first network object. The apparatus also includes a community setting part configured to establish a community with an agent for a first network and an agent for a second agent, select a first representative agent of the community, and establish a community with the first representative agent selected and other adjacent representative agents.

20 Claims, 9 Drawing Sheets

APPARATUS AND METHOD FOR PROCESSING QUERY IN PORTABLE TERMINAL FOR SOCIAL NETWORK

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Dec. 24, 2010, and assigned Serial No. 10-2010-0134465, the entire disclosure of which is hereby incorporated by reference.

TECHNICAL FIELD OF THE INVENTION

The present disclosure relates generally to a portable terminal which supports a social network. More particularly, the present disclosure relates to an apparatus and a method for generating a community with agents of the same character in a social network and processing an answer to a query by sharing information between the generated communities.

BACKGROUND OF THE INVENTION

In recent times, use of portable terminals is pervasive as one of necessities in modern life. Service providers and terminal manufacturers are competitively developing products or services to distinguish them from others.

For example, the portable terminal is evolving into a multimedia device that allows phonebook, games, short text messages, e-mail, wake-up call, MP3, schedule management function, digital camera, multimedia message, and wireless Internet service, and thus provides diverse services.

On account of the recent advance of the wireless Internet service, online social network service is spreading such that about one quarter of Internet users are using a Social Network Service (SNS). The online SNS provides an environment for actively sharing and spreading a user's personal information and information of various contents (e.g., video, photos, and Short Messaging Service (SMS)). By sharing the personal information over a network using the online SNS, the user can establish and maintain social relationships (make friends).

The current online SNS interconnects the users based on an online server. To obtain particular information, the SNS directly connects to the user which provides the particular information.

Disadvantageously, as the number of the SNS users increases, the user has to connect to many users to obtain information. As the amount of the information held by the user increases, some inaccurate information of the user may also increase.

Mostly, to share the information in the SNS, a separate server for managing the information is employed, but the server equipment is associated with additional costs.

To address those shortcomings, an apparatus and a method for rapidly obtaining the user's intended information are demanded.

SUMMARY OF THE INVENTION

To address the above-discussed deficiencies of the prior art, it is a primary aspect of the present disclosure to provide an apparatus and a method for processing a query using a social network.

Another aspect of the present disclosure is to provide an apparatus and a method for generating a community with agents of the same character and sharing information between the communities in a social network.

Yet another aspect of the present disclosure is to provide an apparatus and a method for generating a representative agent which represents a community including agents of the same character and controlling the agents of the community in a social network.

A further aspect of the present disclosure is to provide an apparatus and a method for generating a community with representative agents in a social network.

In accordance with an aspect of the present disclosure, an apparatus for processing a query using a social network is provided. The apparatus includes an agent determiner configured to set an agent for a first network object. The apparatus also includes a community setting part configured to establish a community with an agent for a first network and an agent for a second agent, select a first representative agent of the community, and establish a community with the first representative agent selected and other adjacent representative agents.

In accordance with another aspect of the present disclosure, a method for processing a query using a social network includes setting an agent for a first network object. The method also includes establishing a community with an agent for a first network and an agent for a second agent. The method further includes selecting a first representative agent of the established community. The method still further includes establishing a community with the first representative agent selected and other adjacent representative agents.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain exemplary embodiments of the present disclosure will be more apparent from the following description taken in conjunction with the accompanying drawings, in which.

Throughout the drawings, like reference numerals will be understood to refer to like parts, components and structures.

DETAILED DESCRIPTION OF THE INVENTION

FIGS. 1 through 6C, discussed below, and the various embodiments used to describe the principles of the present disclosure in this patent document are by way of illustration only and should not be construed in any way to limit the scope of the disclosure.

Exemplary embodiments of the present disclosure provide an apparatus and a method for generating one community with agents of the same character in a social network and processing a query of the social network which share information between communities.

Figure 1:
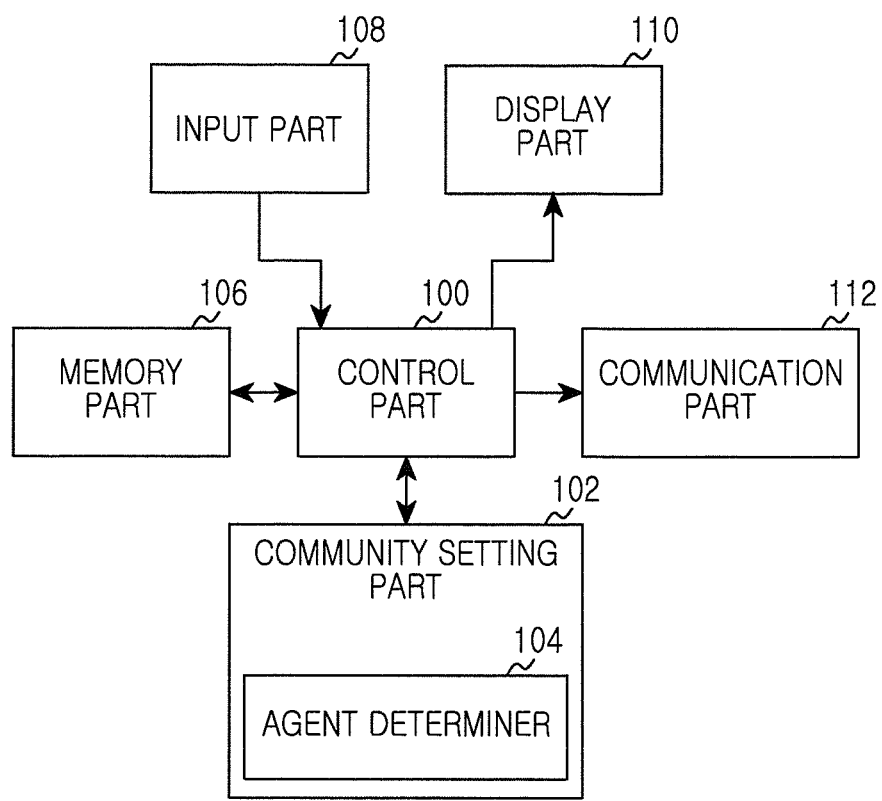
FIG. 1 is a block diagram of a portable terminal which supports a social network for processing a query according to an embodiment of the present disclosure.

FIG. 1 is a block diagram of a portable terminal which supports a social network for processing a query according to an embodiment of the present disclosure.

Referring to FIG. 1, the portable terminal includes a control part 100, a community setting part 102, a memory part 106, an input part 108, a display part 110, and a communication part 112. The community setting part 102 can include an agent determiner 104.

The control part 100 of the portable terminal controls operations of the portable terminal. For example, the control part 100 processes and controls voice communication and data communication. In addition, the control part 100 processes a query using the social network. That is, the control part 100 generates one community with agents of the same character, and processes to share information between communities. When a query is requested in the generated community, the control part 100 processes to provide a query requester with an answer to the query.

Under the control of the control part 100, the community setting part 102 determines the character of other agents which use the social network, establishes a community with the agents of the same character, and establishes a community with representative agents of the established communities. The agent determiner 104 of the community setting part 102 classifies the agents of the same character.

The memory part 106 preferably includes, for example, a Read Only Memory (ROM), a Random Access Memory (RAM), and a flash ROM. The ROM stores microcodes and reference data of a program for the processing and the controlling of the control part 100 and the community setting part 102.

The RAM, which is a working memory of the control part 100, stores temporary data generating in the program execution. The flash ROM stores updatable storage data such as phone book, outgoing and incoming messages, metadata, and a database for storing data.

The input part 108 includes a plurality of function keys such as number key buttons 0~9, menu button, cancel button, OK button, call button, end button, Internet access button, navigation key (or direction key) buttons, and letter input keys. The input part 108 provides the control part 100 with key input data corresponding to the key pressed by the user.

The display part 110 displays state information, letters, videos and still images generated in the operation of the portable terminal. The display part 110 can employ a color Liquid Crystal Display (LCD), Active-Matrix Organic Light-Emitting Diode (AMOLED), and the like. When the display part 110 includes a touch input device and is applied to a touch-type terminal, the display part 110 can be used as the input device.

The communication part 112 processes to send and receive radio signals of data input and output via an antenna (not illustrated). For example, for a transmission, the communication part 112 channel-codes and spreads data to transmit, processes the data to a Radio Frequency (RF) signal, and transmits the RF signal. For a reception, the communication part 112 converts a received RF signal to a baseband signal and restores the data by dispreading and channel-decoding the baseband signal.

While the control part 100 of the portable terminal can function as the community setting part 102, they are separately illustrated here to distinguish their own functions, not to limit the scope of the disclosure. One skilled in the art shall understand that various modifications can be made without departing from the spirit and scope of the disclosure. For example, the control part 100 can process all of the functions of the community setting part 102.

Figure 2:
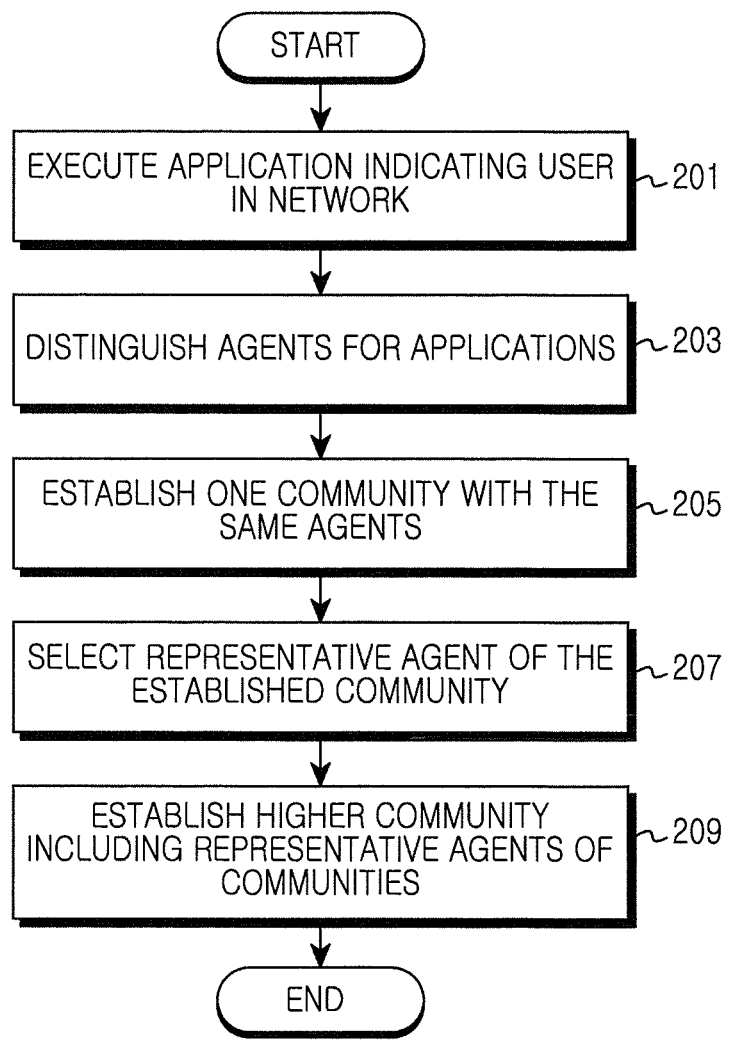
FIG. 2 is a flowchart of a method for processing the query in the social network according to an embodiment of the present disclosure.

FIG. 2 is a flowchart of a method for processing a query in the social network according to an embodiment of the present disclosure.

Referring to FIG. 2, when an application or an object (e.g., Twitter®, Facebook®, a blog, a personal homepage, and an application of the social network) indicating the user in the network is executed in block 201, the social network distinguishes agents for applications in block 203. Herein, the agent relates to a function processable by the application. As a comparative analogy, in an application for car rental, agents based on the automobile type (an agent for compact cars and an agent for midsize cars) and agents based on the region (an agent searching for automobiles in Seoul, Korea) can be distinguished. The social network can distinguish the agents by analyzing tag information of the field of interest set by the user. That is, as the social network can determine the agent of a first network application, the user can set the agent for the application.

Next, the social network sets the agents of the same character as one community in block 205, and selects a representative agent of the set community in block 207. Herein, block 205 establishes the community between agents of a first network object and agents of a second network object. The social network establishes one community with the same agents and selects the representative agent which communicates with the agents of the community. Thus, the selected representative agent can share a query with the agents of the community. In so doing, the social network processes to form the community with the representative agent and a representative agent of another community.

In block 209, the social network establishes a higher community with the representative agents of the communities. Herein, the social network forms the community of the representative agents of the same character among the representative agents, to thus expand the range of the query sharing.

After selecting a representative agent of the higher community, the social network can expand the range of the query sharing until one representative agent remains, by repeatedly generating the community with the selected representative agents.

Next, the social network finishes this process.

Figure 3:
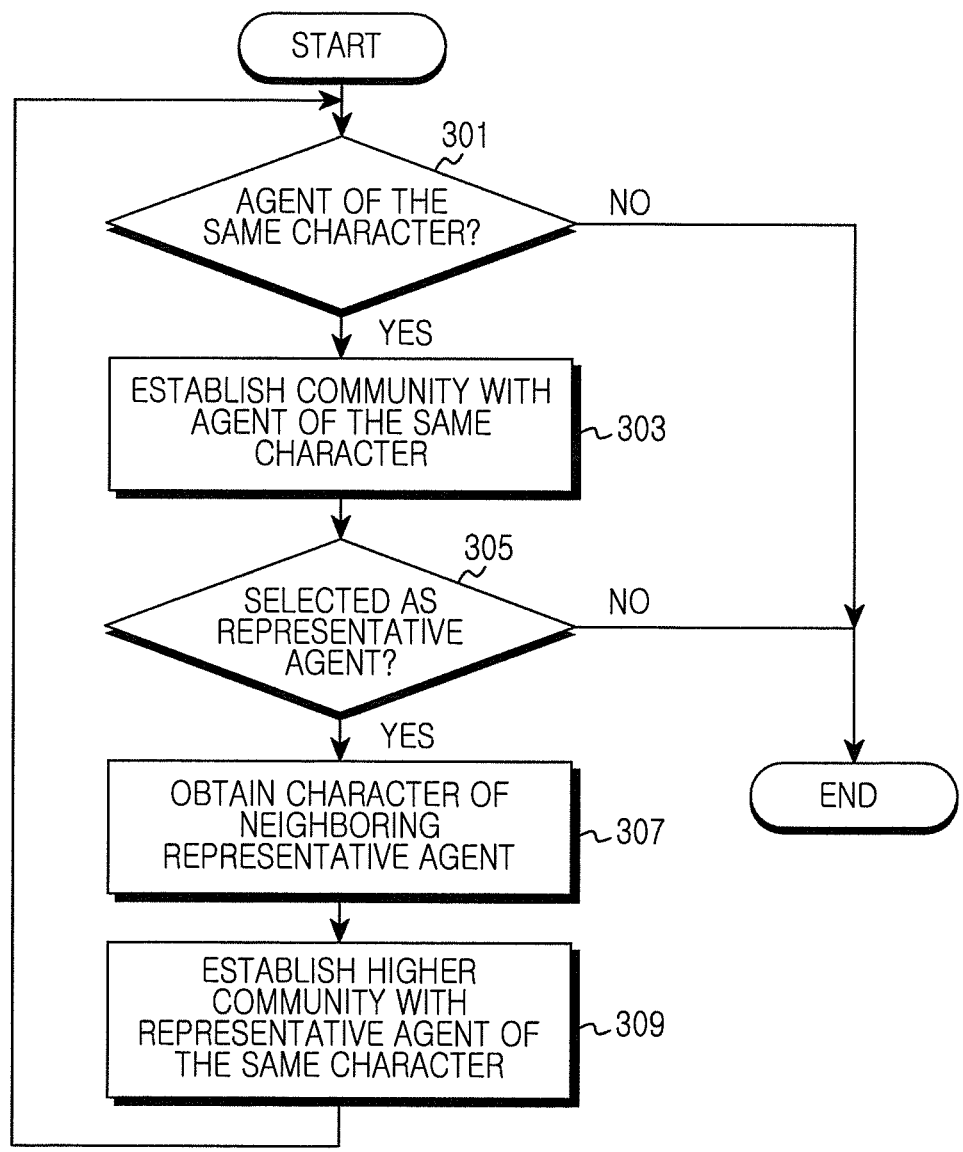
FIG. 3 is a flowchart of a method for generating a community with agents according to an embodiment of the present disclosure.

FIG. 3 is a flowchart of a method for generating the community with the agents according to an embodiment of the present disclosure.

Referring to FIG. 3, the agent determines whether there exists an agent of the same character in block 301. Herein, an agent of the same character indicates an agent associated with a similar function processed by the application. The agent of the same character may be the agent capable of answering a particular query among the agents.

When there is no agent of the same character in block 301, the agent finishes this process.

Upon detecting an agent of the same character in block 301, the agent establishes the community with the agent of the same character in block 303 and determines whether it is selected as the representative agent of the established community in block 305. Herein, the agent selects the representative agent which communicates with the agents of the same community. The selected representative agent can share the query with the agents of the community and receive the answer to the query. In addition, the representative agent can establish the community with the representative agents of the other communities and participate in the representative agent selection of the established community.

When not selected as the representative agent in block 305, the agent can finish the community establishment and provide the answer to the query in the community.

By contrast, when selected as the representative agent in block 305, the agent obtains the character of the other representative agents in vicinity in block 307 and establishes a higher community with the representative agent of the same character among the other representative agents in block 309, to thus expand the range of the query sharing.

Herein, the higher community is generated to communicate between the representative agents, and the agent selects the representative agent of the generated higher community.

Next, the agent returns to block 301. When the agent is selected as the representative agent of the higher community, the agent repeats the higher community establishment by determining whether there is a community to establish.

Figure 4:
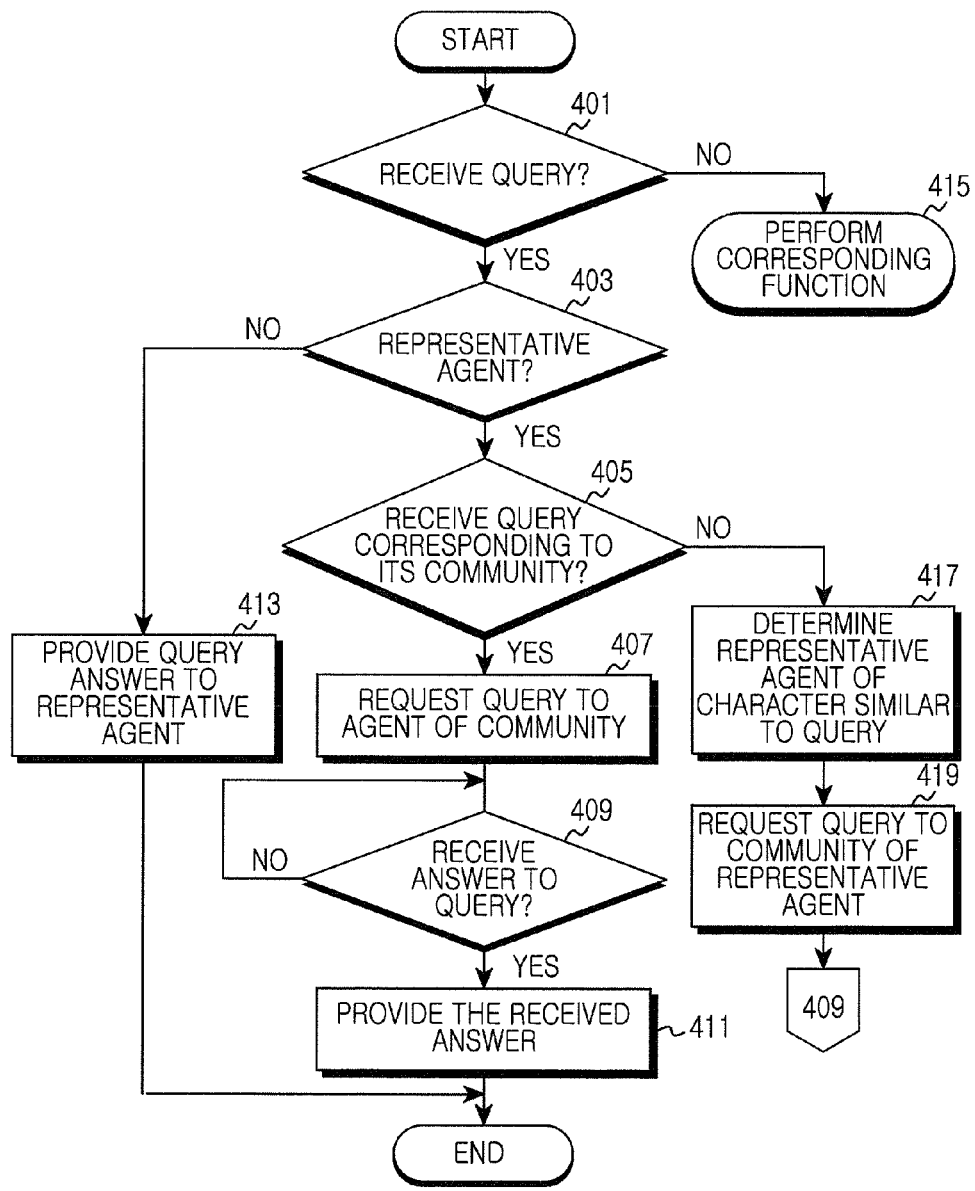
FIG. 4 is a flowchart of a method of the agent for answering the query according to an embodiment of the present disclosure.

FIG. 4 is a flowchart of a method of the agent for answering the query according to an embodiment of the present disclosure.

Referring to FIG. 4, the agent determines whether a query is received in block 401 while the community is organized with the agents of the same character. Herein, the query is received from the user or the representative agent.

When receiving no query in block 401, the agent performs a corresponding function (e.g., a standby mode) in block 415.

When the query is received in block 401, the agent determines whether it is the representative agent of the community in block 403.

When the agent is not the representative agent of the community in block 403, the query in block 401 is received from the representative agent. Accordingly, the agent (the agent forming the community) provides the answer to the query to the representative agent in block 413.

That is, the agents in the community (the agents forming the community) receive the query from the representative agent, and the agent capable of answering the query provides the answer to the query to the representative agent. In so doing, the agent in the community can be duplicated in one or more other communities according to its character. The agent concurrently shares the sharing information of the different communities in its community.

When the agent is the representative agent of the community in block 403, the query received in block 401 originates from the user. Hence, the agent (the representative agent) determines whether the query corresponding to its representative community is received in block 405. The community includes the agents of the same character, and the representative agent can rapidly provide the answer to a query having the same character as the community. Yet, when receiving a query different from the community character, the representative agent can determine a representative agent of the community having the same character as the query character and receive the answer of the query from the community.

Upon receiving the query corresponding to its representative community in block 405, the agent (the representative agent) requests the query to the agents in its community (the agents forming the community) in block 407. Thus, the agent capable of answering the query of the representative agent among the agents of the community provides the answer to the representative agent.

In block 409, the agent (the representative agent) determines whether the answer to the query is received from the agent in the community.

When not receiving the answer to the query from the agent in the community in block 409, the agent (the representative agent) repeats block 409.

Upon receiving the answer to the query from the agent in the community in block 409, the agent (the representative agent) provides the received answer to the query requester in block 411 and thus completes the answer provision from its community.

When not receiving the query corresponding to its representative community in block 405, the agent (the representative agent) determines the representative agent of the same community as the query character in block 417 and requests the query to the representative agent of the same community as the query character in block 419.

Thus, the other representative agent (the representative agent of the same community as the query character) receiving the request receives the answer of the query from the agent capable of answering the query.

In block 409, the agent (the representative agent) determines whether the answer to the query is received from the agent in the community.

When not receiving the answer to the query from the agent in the community in block 409, the agent (the representative agent) repeats block 409.

Upon receiving the answer to the query from the agent in the community, the agent (the representative agent) provides the received answer to the query requester in block 411.

Next, the agent finishes this process.

In FIG. 4, the plurality of the representative agents manages their community. When there exists only the representative agent for managing the highest community, the representative agent establishes the network for sharing the query with all of the agents in the network, and can easily obtain the answer to the query by sending the query to the lower communities.

Figure 5A:
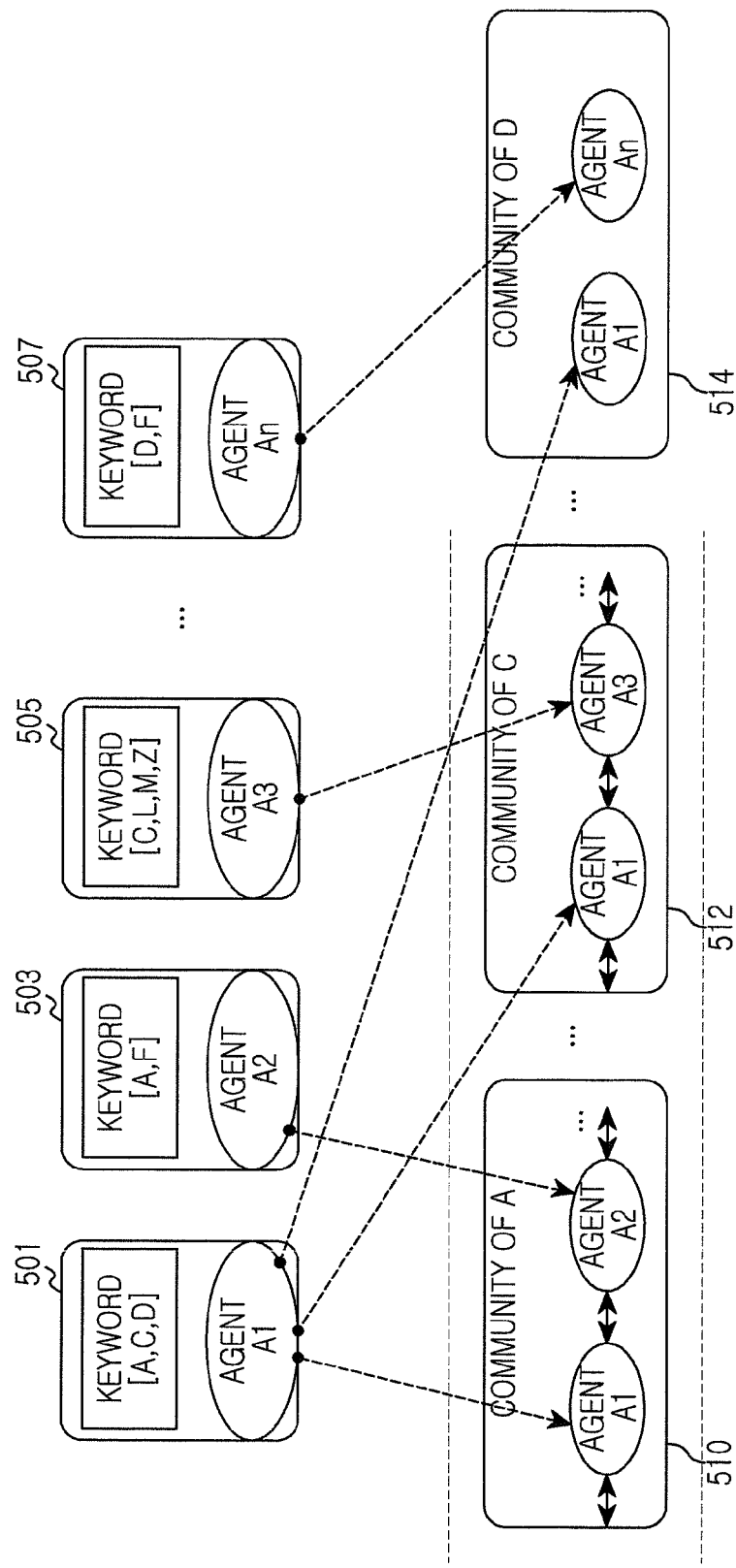
FIG. 5A is a diagram of the community generation in the social network according to an embodiment of the present disclosure.
Figure 5B:
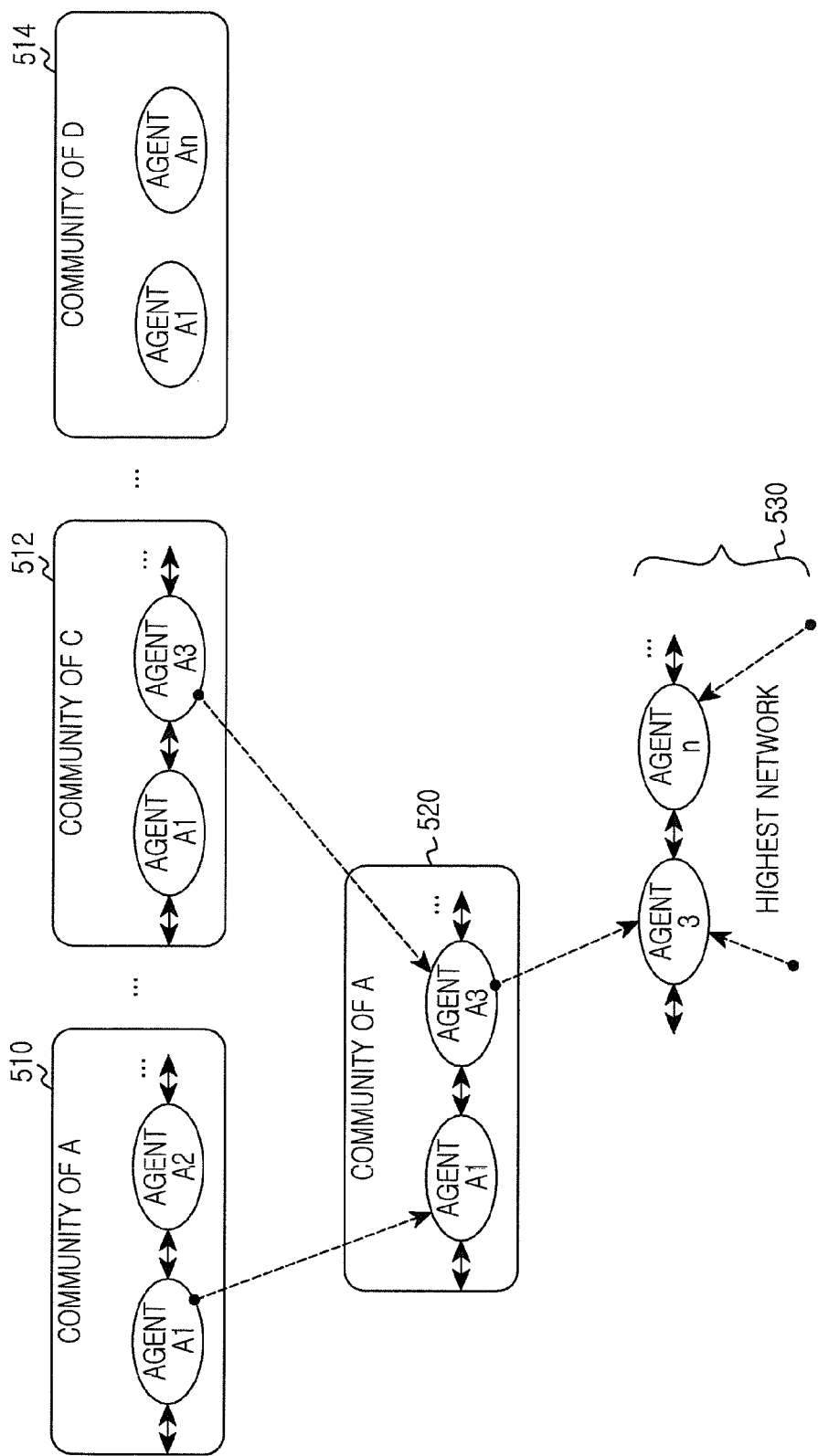
FIG. 5B is a diagram of a higher community generated using representative agents in the social network according to an embodiment of the present disclosure.

FIGS. 5A and 5B illustrate the higher community establishment with the representative agents in the social network according to an embodiment of the present disclosure.

FIG. 5A depicts the community generation in the social network according to an embodiment of the present disclosure.

Referring to FIG. 5A, the social network is connected to a plurality of agents. Herein, the agents correspond to one or more functions, and include an agent A1 501 for processing keywords A, C, and D, an agent A2 503 for processing the keywords A and F, an agent A3 505 for processing the keywords C, L, M, and Z, . . . , and an agent An 507 for processing the keywords D and F as shown in FIG. 5A.

The social network defines the agent for processing the same keyword as the agent of the same character, and generates one community with the defined agent of the same character.

For example, the social network can define primary communities which are classified to a community 501 of the agents for processing the keyword A, a community 512 of the agents for processing the keyword C, and a community 514 of the agents for processing the keyword D.

As shown in FIG. 5A, the community of the agents for processing the keyword A includes the agent A1 and the agent A2, and the community of the agents for processing the keyword C includes the agent A1 and the agent A3. The community of the agents for processing the keyword D includes the agent A1 and the agent An. Besides the community of the agents for processing the keyword A, the agent for processing the keyword A also belongs to the community of the agents for processing the keywords C and D. That is, the letter in the keyword bracket of the agent indicates the capability of the agent for processing the keyword corresponding to the letter, and implies that the agent can be included in the community corresponding to the letter in the bracket.

The agents of the same community can communicate with each other in the community, but the agents of the different communities cannot communicate with each other. Accordingly, the communication range of the agent is limited to the corresponding community.

To expand the communication range of the agent, the social network selects the representative agents of the communities and generates a higher community with the selected representative agents, which shall be explained in FIG. 5B.

FIG. 5B depicts the higher community generated with the representative agents in the social network according to an embodiment of the present disclosure.

Referring to FIG. 5B, after the representative agents of the communities are selected from the agents of the generated communities of FIG. 5A, the higher community is organized using the selected agents. The social network can define the higher community as the network including the representative agents.

For example, the agent A1 is selected as the representative agent (a first representative agent) of the community 510, which includes the agents for processing the keyword A, and the agent A3 is selected as the representative agent (a second representative agent) of the community 512, which includes the agents for processing the keyword B. When the representative agent A1 (the first representative agent) and the representative agent A3 (the second representative agent) have the same character, the two representative agents establish one higher community 520. That is, the first representative agent establishes the community with the second representative agent or/and a third representative agent. In so doing, the social network can select the agent having the best query processing capability (e.g., the agent capable of processing a greater number of the keywords) among the agents of the community, as the representative agent, Likewise, the social network can select a representative agent from the agents for processing the keyword D of the community 514.

Next, the social network can select the representative agent having the best query processing capability among the representative agents of the established higher community 520, as a representative agent of the higher community 520 so that the representative agent of the highest community (a highest representative agent) is left alone.

As shown in FIG. 5B, the social network generates the higher community (network) 520 with the first representative agent A1 of the community of the agents for processing the keyword A and the second representative agent A3 of the community of the agents for processing the keyword C, and selects the representative agent A3 of the higher network 520. In so doing, the representative agent A3 belongs to not only the community for processing the keyword C but also the communities for processing the keywords L, M and Z, and thus can concurrently share the information of the communities corresponding to the keywords L, M and Z.

Next, the representative agent A3 of the higher community communicates with the agent An. The agent A3 and the agent An become the agents of the highest community 530, and either agent can be the highest representative agent.

When the communities are generated as above and the query for the keyword F is to be processed, the social network processes the query by communicating with the agent A1 via the agent A3 and the agent A1 processes the query for the keyword F through the agent A2. That is, the agent A2 sends the answer to the query for the keyword F to the agent A1, and the agent A1 forwards the received answer to the agent A3.

Figure 6A:
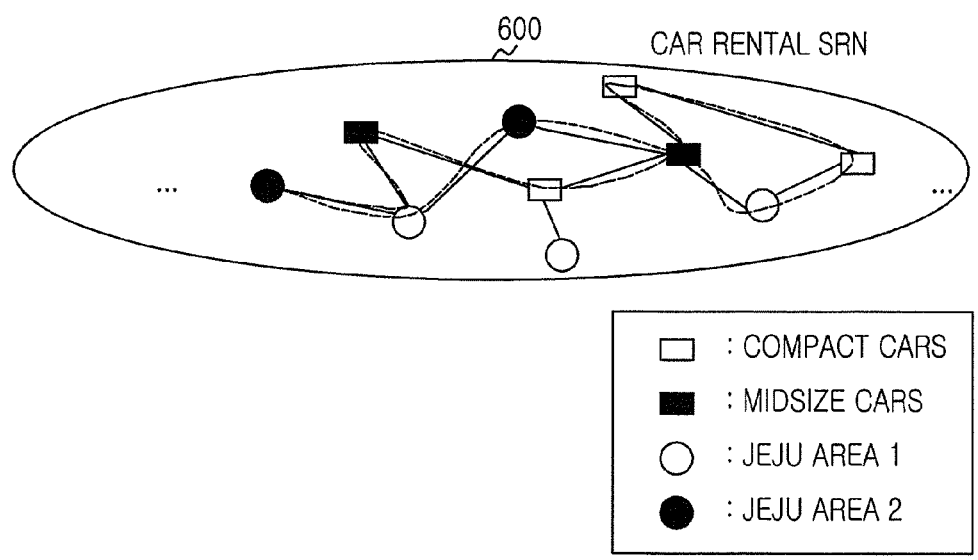
FIG. 6A is a diagram of a general social network.
Figure 6B:
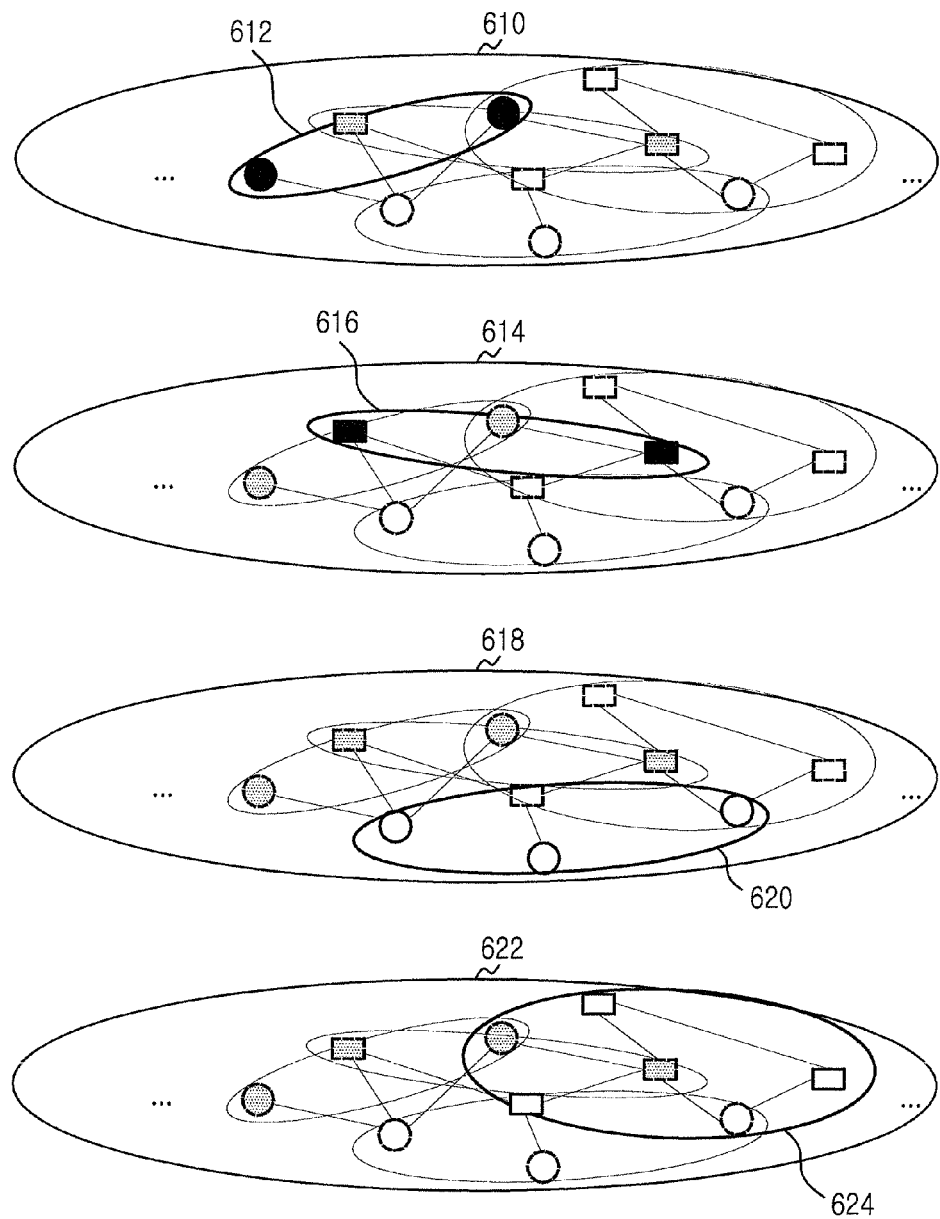
FIG. 6B is a diagram of the community generated with agents of similar character according to an embodiment of the present disclosure.
Figure 6C:
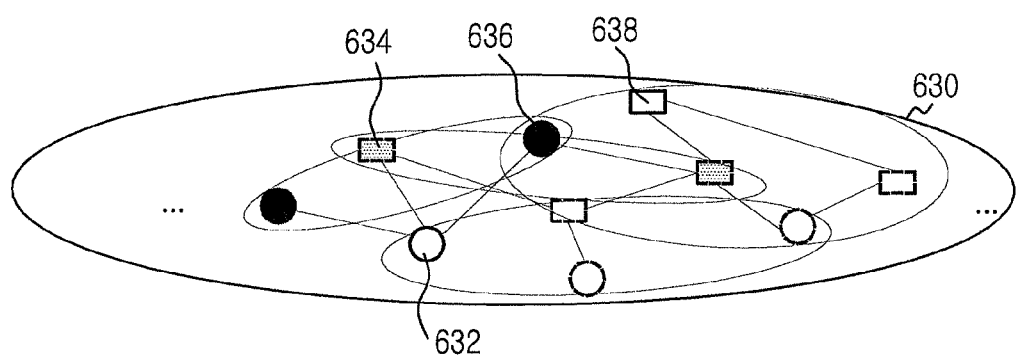
FIG. 6C is a diagram of the information shared between the communities in the social network according to an embodiment of the present disclosure.

FIGS. 6A, 6B and 6C illustrate the query processing of the social network according to an embodiment of the present disclosure.

Referring to FIGS. 6A, 6B and 6C, the social network is assumed to provide car rental information.

FIG. 6A depicts a general social network.

In FIG. 6A, the social network includes agents for the compact car, agents for the midsize car, and agents for areas of Jeju, Korea.

To determine the car rental information, the user searches for the agent corresponding to the information to search in person.

That is, since the agents establishing the social network are connected to the agents of the different characters but do not share the information between them, the user directly communicates with the agent having the user's intended information. As a result, in the worst case, it is necessary to communicate with all of the agents in the social network.

FIG. 6B depicts the community generated with the agents of the similar character according to an embodiment of the present disclosure.

In FIG. 6B, the social network includes the agents of the same character, and the agents communicate with the agent of the different character.

Hence, the social network classifies the agents for the compact car, the agents for the midsize car, and the agents for the areas of Jeju into the communities. The agents for the compact car are classified to a community 612 as shown in FIG. 6B.

While the community of the social network includes the agents of the same character, the agents can have the same character as the agent of the other community.

Accordingly, the agents of the community can share their information in the social network, and share the information with the agent of the other community. For example, provided that two agents for the compact car belong to the same community 612, one of the two agents has the same character as the agent for the Jeju area 2, and the other has the same character as the agent for the midsize car, the agents for the compact car of the community 612 can share even the information of the agents for the midsize car and the Jeju area 2 in the social network 610.

Likewise, the agents for the midsize car generate a community 616, the agents for the first area of Jeju generate a community 620, the agents for the second area of Jeju generate a community 624, and social networks 614, 618 and 622 corresponding to the communities can also share the information of the different communities according to the agents of the community FIG. 6C depicts the information shared between the communities in the social network according to an embodiment of the present disclosure.

In FIG. 6C, a social network 630 classifies the four communities based on the character of the agent and each community includes the plurality of the agents as stated above.

The agents of the communities select their representative community agents 632, 634, 636, and 638, and the selected agents send the query to the agents of the community.

The representative agents can expand the range of the query processing by establishing the community with the representative agents of the same character.

When the query processing is required in the social network 630, the query is sent to the representative agents 632 through 638 and the representative agents 632 through 638 receiving the query request the agents of the community to answer the query. Thus, the agent which requests the answer to the query can obtain the answer of the query by communicating with the agents of the same character and provide the answer to the representative agent.

As set forth above, the apparatus and the method for processing the query of the social network generate one community with the agents of the same character in the social network and share the information between the communities. Therefore, the user can obtain his/her intended information accurately and rapidly.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for use in a social network, the apparatus comprising:
a communication unit; and
a control unit configured to:
determine a character of each of a plurality of agents for each of a plurality of applications associated with the social network,
wherein each of the plurality of agents relates to a function processable by a corresponding application of the plurality of applications, and
wherein the character of each of the plurality of agents indicates a function associated with the agent that is processed by the corresponding application;
establish, by controlling the communication unit, a first community including agents associated with a first character of the determined characters;
establish, by controlling the communication unit, a second community including agents associated with a second character of the determined characters, the second community including at least one agent included in the first community;
select a first representative agent for the first community and a second representative agent for the second community;
establish, by controlling the communication unit, a higher community including the selected representative agents; and
share information with the first community and the second community via the representative agents included in the higher community.

2. The apparatus of claim 1, wherein the control unit is configured to control a sharing of information between at least one community and the higher community.

3. The apparatus of claim 1, wherein the control unit is configured to control a sharing of information between the selected representative agents included in the higher community.

4. The apparatus of claim 1, wherein the control unit is configured to control a sharing of information with at least one agent included in the first community via the first representative agent of the first community and a sharing of information with at least one agent included in the second community via the second representative agent of the second community.

5. The apparatus of claim 1, wherein at least one of the representative agents is duplicated in the another community based on the character of the representative agent.

6. The apparatus of claim 5, wherein the control unit is configured to control a sharing of information in the other community via the representative agent duplicated in the another community.

7. The apparatus of claim 1, wherein the control unit is configured to select an agent from community as the representative agent based on having a greatest query processing capability among the plurality of agents included in the community.

8. The apparatus of claim 1, wherein the application comprises at least one of a social networking service, a blog, a personal homepage, or an application of the social network.

9. A method implemented by an apparatus in a social network, the method comprising:
determining a character of each of a plurality of agents for each of a plurality of applications associated with a social network,
wherein each of the plurality of agents relates to a function processable by a corresponding application of the plurality of applications, and
wherein the character of each of the plurality of agents indicates a function associated with the agent that is processed by the corresponding application;
establishing a first community including agents associated with a first character of the determined characters;
establishing a second community including agents associated with a second character of the determined characters, the second community including at least on agent included in the first community;
selecting a first representative agent for the first community and a second representative agent for the second community; and
establishing a higher community including the selected representative agents; and sharing information with the first community and the second community via the representative agents included in the higher community.

10. The method of claim 9, wherein sharing information with the first community and the second community comprises sharing information between at least one community and the higher community.

11. The method of claim 10, wherein sharing the information with the first community and the second community comprises:
sharing information between the selected representative agents included in the higher community.

12. The method of claim 11, wherein sharing the information with the first community and the second community comprises:
sharing information with at least one agent included in the first community via the first representative agent of the first community and sharing information with at least one agent included in the second community via the second representative agent of the second community.

13. The method of claim 9, wherein at least one of the representative agent is duplicated in another community based on the character of the representative agent.

14. The method of claim 13, wherein sharing the information with the first community and the second community comprises:
sharing information in the other community via the representative duplicated in the another community.

15. The method of claim 9, wherein the representative agent is an agent of the community having a greatest query processing capability among the plurality of agents included in the community.

16. The method of claim 9, wherein the application comprises at least one of a social networking service, a blog, a personal homepage, or an application of the social network.

17. A network, comprising:
a plurality of apparatuses configured for use in the network, each apparatus comprising:
an agent determining unit configured to set a first agent as an agent for a first network, wherein an agent relates to a function processable by an application; and
a community setting unit configured to:
establish a first community including the first agent and at least a second agent of a second network based on a common character among a plurality of agents, wherein the first agent and at least a second agent are associated with a similar function processed by the application,
select a first representative agent of the first community among the first agent and at least the second agent, and
establish a higher community with the first representative agent and at least a second representative agent of a second community.

18. The network of claim 17, each apparatus further comprising:
a control unit configured to control a sharing of information between at least the first community and the higher community.

19. The network of claim 18, wherein the control unit is configured to control the sharing of information between at least the first representative agent and the second representative agent.

20. The network of claim 19, wherein the control unit is configured to control the sharing of information with at least one agent included in the first community via the first representative agent and the sharing of information with at least one agent included in the second community via the second representative agent.

* * * * *